United States Patent
Mikiyas et al.

(10) Patent No.: US 9,824,462 B2
(45) Date of Patent: Nov. 21, 2017

(54) METHOD FOR DETECTING OBJECT AND OBJECT DETECTING APPARATUS

(71) Applicant: SAMSUNG ELECTRONICS CO., LTD., Suwon-si, Gyeonggi-do (KR)

(72) Inventors: Teshome Mikiyas, Suwon-si (KR); Ho-yub Jung, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 124 days.

(21) Appl. No.: 14/857,099

(22) Filed: Sep. 17, 2015

(65) Prior Publication Data

US 2016/0086337 A1    Mar. 24, 2016

(30) Foreign Application Priority Data

Sep. 19, 2014    (KR) .................. 10-2014-0124733

(51) Int. Cl.
*G06K 9/00* (2006.01)
*G06T 7/62* (2017.01)
(Continued)

(52) U.S. Cl.
CPC ............ *G06T 7/62* (2017.01); *G06K 9/00369* (2013.01); *G06K 9/3241* (2013.01); *G06K 9/6219* (2013.01); *G06K 9/6857* (2013.01); *G06T 7/215* (2017.01); *G06T 2207/20016* (2013.01); *G06T 2207/20081* (2013.01); *G06T 2207/30196* (2013.01)

(58) Field of Classification Search
CPC . G06T 2207/30196; G06T 2207/10016; G06T 2207/20016; G06T 2207/20081; G06T 7/0044; G06T 7/20; G06T 7/215; G06T 7/60; G06T 7/62; G01L 19/143; G06K 9/00369; G06K 9/3241; G06K 9/6219; G06K 9/6857; H04N 7/18

See application file for complete search history.

(56) References Cited

U.S. PATENT DOCUMENTS

| | | | |
|---|---|---|---|
| 2009/0041297 A1 | 2/2009 | Zhang et al. | |
| 2013/0182947 A1* | 7/2013 | Wang | ................... G06T 7/0042 382/159 |

(Continued)

FOREIGN PATENT DOCUMENTS

| | | |
|---|---|---|
| JP | 2013-155924 | 8/2013 |
| JP | 2014-002734 | 1/2014 |

(Continued)

OTHER PUBLICATIONS

Dalal et al., "Histograms of Oriented Gradients for Human Detection", *HAL*, Jun. 2005, 9 pages.

(Continued)

*Primary Examiner* — Tom Y Lu
(74) *Attorney, Agent, or Firm* — Nixon & Vanderhye P.C.

(57) ABSTRACT

A method for detecting an object includes inputting information of a moving object included in a plurality of images and generating a regression tree. In response to input of a new image, the system communicates information of a moving object included in the newly inputted image into the regression tree, and determines a size of a person included in the new image based on a resultant value of the regression tree.

17 Claims, 9 Drawing Sheets

(51) Int. Cl.
G06T 7/215 (2017.01)
G06K 9/32 (2006.01)
G06K 9/62 (2006.01)
G06K 9/68 (2006.01)

(56) References Cited

U.S. PATENT DOCUMENTS

2014/0205141 A1* 7/2014 Gao .................... G06T 7/20
382/103
2014/0369555 A1* 12/2014 Zhong ................ G06K 9/3233
382/103

FOREIGN PATENT DOCUMENTS

| KR | 10-2013-0036950 | 4/2013 |
| KR | 10-1282742 | 7/2013 |
| KR | 10-2014-0033025 | 3/2014 |

OTHER PUBLICATIONS

Schulter et al., "Accurate Object Detection with Joint Classification-Regression Random Forests", *Computer Vision Foundation*, 8 pages.

\* cited by examiner

FIG. 1

Scale 1

Scale 2

Scale i

Scale i+1

A sequence with ground truth        Motion History image

METHOD FOR DETECTING OBJECT AND OBJECT DETECTING APPARATUS

CROSS-REFERENCE TO RELATED APPLICATIONS

This application is based on and claims priority under 35 U.S.C. §119 to Korean Patent Application No. 10-2014-0124733, filed on Sep. 19, 2014 in the Korean Intellectual Property Office, the disclosure of which is incorporated herein by reference in its entirety.

BACKGROUND

1. Field

Apparatuses and methods consistent with what is disclosed herein relate to detecting an object, and to an apparatus and a method for detecting an object included in an image rapidly, with rapid and simple computation.

2. Description of the Related Art

In order to detect a person in an image, a fixed-size detection window may be utilized. In this case, the entire region of the screen is scanned with the detection window. Considering the difficulty of detecting a person completely when the size of the person is greater than the detection window, the scale of the detection window is varied to find an optimum size. Because no information is given regarding the size of the object, it is necessary to vary the scale of the detection window. However, such process requires increased computations and time for detecting an object that includes a person in the image.

Accordingly, a technology is necessary, which can detect an object included in an image rapidly, with fast and simple computations.

SUMMARY

Example embodiments overcome the above disadvantages and other disadvantages not described above. Also, example embodiments need not be required to overcome the disadvantages described above, and example embodiments may not overcome any of the problems described above.

According to an embodiment, a technical objective is to provide an apparatus and a method for detecting an object included in an image rapidly, with rapid and simple computations.

According to an embodiment, a method for detecting an object is provided, which may include inputting information of a moving object included in a plurality of images and generating a regression tree, in response to input of a new image, inputting information of a moving object included in the newly inputted image into the regression tree, and determining a size of a person included in the new image based on a resultant value of the regression tree.

The generating the regression tree may include identifying moving pixels, using a difference between corresponding pixels of two or more images, receiving external input information about the moving pixels, and identifying the external input information according to a preset parameter and generating the regression tree.

The information about the moving pixels may include at least one of information as to whether the moving pixels represent a person or not, location information of the moving pixels, and size information of the moving object.

The identifying the external input information according to the preset parameter and generating the regression tree may include arranging nodes having the external input information according to a first parameter and generating the regression tree, and when the external input information of the generated regression tree are not similar to each other, reconstructing the regression tree based on a second parameter which is different from the first parameter.

A leaf node of a final regression tree may include size information of the moving object.

The inputting the information of the moving object included in the newly inputted image may include identifying moving pixels in response to an input of a plurality of new images, using a difference between corresponding pixels of the plurality of newly inputted images, and inputting information about the identified moving pixels into the regression tree.

The information about the identified moving pixels may include location information of the identified moving pixels.

The determining the size of the person included in the new image may include determining if the moving object included in the newly inputted image is a person, based on a resultant value of the regression tree, and determining a size of the moving object, when the moving object is the person.

The method may additionally include setting a detection window scale according to the size of the person.

In an embodiment, an apparatus for detecting an object is provided, which may include a regression tree generator and an object size determiner.

The regression tree generator is configured to input information of a moving object included in a plurality of images and generate a regression tree.

The object size determiner is configured so that in response to input of a new image, the object size determiner inputs information of a moving object included in the newly inputted image into the regression tree, and determines a size of a person included in the new image based on a resultant value of the regression tree.

The regression tree generator is configured to identify moving pixels, using a difference between corresponding pixels of two or more images, in response to receiving external input information about the moving pixels, identify the external input information according to a preset parameter and generating the regression tree.

The information about the moving pixels may include at least one of information as to whether the moving pixels represent a person or not, location information of the moving pixels, and size information of the moving object.

Further, the regression tree generator is configured to arrange nodes having the external input information according to a first parameter and generate the regression tree, and when the external input information of the generated regression tree are not similar to each other, reconstruct the regression tree based on a second parameter which is different from the first parameter.

A leaf node of a final regression tree may include size information of the moving object.

The object size determiner is configured to identify moving pixels in response to an input of a plurality of new images, using a difference between corresponding pixels of the plurality of newly inputted images, and input information about the identified moving pixels into the regression tree.

The information about the identified moving pixels may include location information of the identified moving pixels.

The object size determiner is configured to determine if the moving object included in the newly inputted image is a person, based on a resultant value of the regression tree, and determine a size of the moving object, when the moving object is the person.

According to various embodiments, an apparatus and a method are capable of detecting an object included in an image rapidly, with fast and simple computations.

BRIEF DESCRIPTION OF THE DRAWINGS

The above and/or other aspects of example embodiments will be more apparent by describing certain example embodiments with reference to the accompanying drawings, in which.

DETAILED DESCRIPTION

Certain example embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of example embodiments. Accordingly, it is apparent that the example embodiments can be carried out with or without those specifically defined matters. Also, well-known functions or constructions are not described in detail since they would obscure the description with unnecessary detail.

Figure 1:
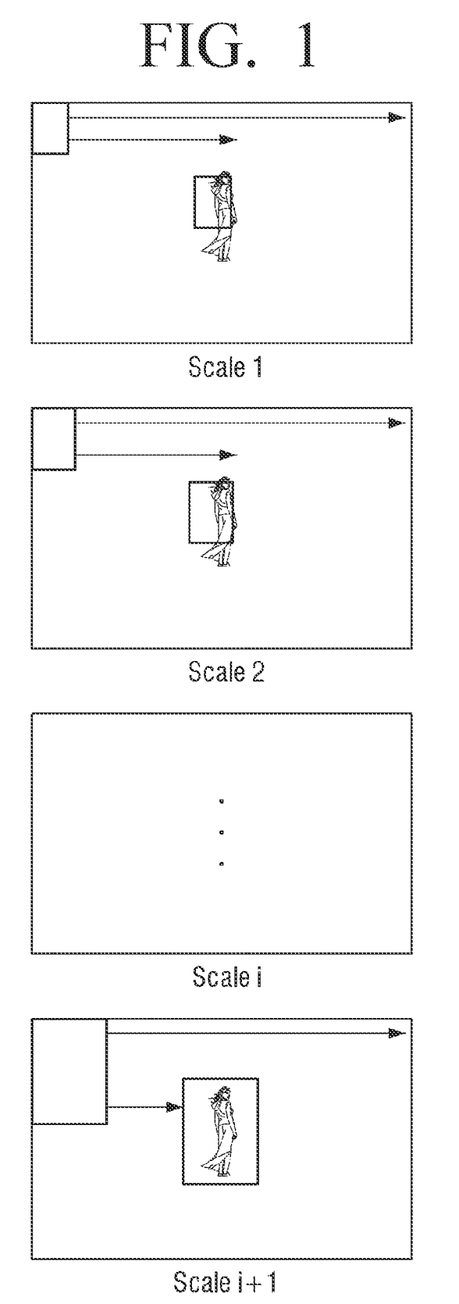
FIG. 1 illustrates a method for detecting an object using a conventional detection window.

FIG. 1 illustrates a method for detecting an object using a conventional detection window.

A fixed size detection window may be utilized to detect a person in an image. The entire region of the image is scanned with the detection window. When the size of the person is larger than the detection window, it is difficult to detect the person completely. Accordingly, an optimum size is found, while the scale of the detection window is increased. Because there is no information about the size of the object, the related technology requires that the scale of the detection window be varied in sequence, while performing scan over a plurality of scales. However, such operation requires increased computations and time to detect an object including a person.

Example embodiments provide a detection technology, which is capable of determining a size of an object and setting a detection window suitable for the object rapidly, using a regression tree having size information of object pixel included in an image. Example embodiments allow a camera apparatus such as CCTV to set a detection window rapidly with respect to an image including a fixed background representing a specific place and a moving object such as a person. When obtaining a photographed image by successive photography of a specific place, the size of a moving object such as a person moving in the specific place can be predicted based on a location of the object on or in the photographed image. For example, when a camera installed on a corner of a ceiling of a corridor in a building is photographing the corridor of the building, as a person moves closer to the camera from a location farther away from the camera, the object, which appears initially small on or in the photographed image, increases in size. That is, there is correlation between the location on the photographed image and the size of the object. Example embodiments generate a regression tree having information about the correlation and rapidly determine the size of the object according to the location of the object on or in the image. When the size of the object is determined, it is possible to set the corresponding size of the detection window.

Figure 2:
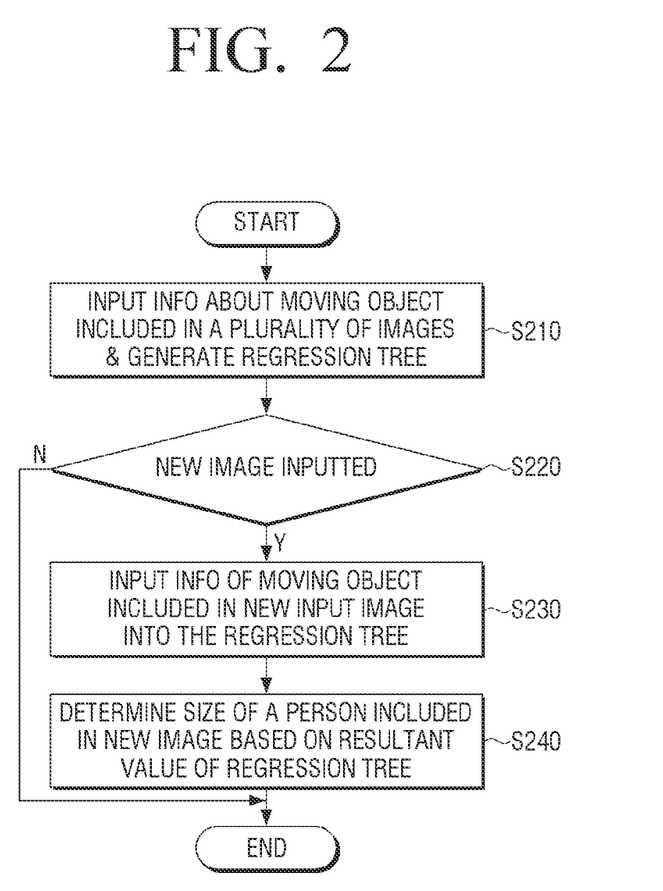
FIG. 2 is a flowchart of a detection method according to an example embodiment.

FIG. 2 illustrates a flowchart of a detection method according to an example embodiment.

Referring to FIG. 2, at S210, a counting method according to an embodiment first generates a regression tree. Generally, the regression analysis represents a method for finding a mathematic formula which can best or adequately express the given data. The regression tree constructs a tree that can best or adequately express the given data, while varying parameters. Since obtaining an optimum regression tree(s) is the purpose, this stage can be referred to as a training stage. When new data is given, the attributes of the new data may be predicted with the resultant values of the regression tree.

According to an embodiment, the regression tree is generated by inputting information about the moving object included in a plurality of successive image frames which make up a video. The regression tree is thus constructed, which can best or adequately express the information about the moving object on the successive image frames. This will be explained in more detail below.

At S220-Y, when a new image is input after the construction of the regression tree, the regression tree is traversed based on the information about the image. Specifically, at S230, the information of the moving object included in the newly inputted image is input to the regression tree.

According to a result of the regression tree traversal, i.e., according to leaf node value, the attributes of the moving object included in the new image are determined According to an embodiment, it is possible, at S240, to determine the size of a person included in the new image based on the resultant values of the regression tree. This will be explained in more detail below.

Figure 3:
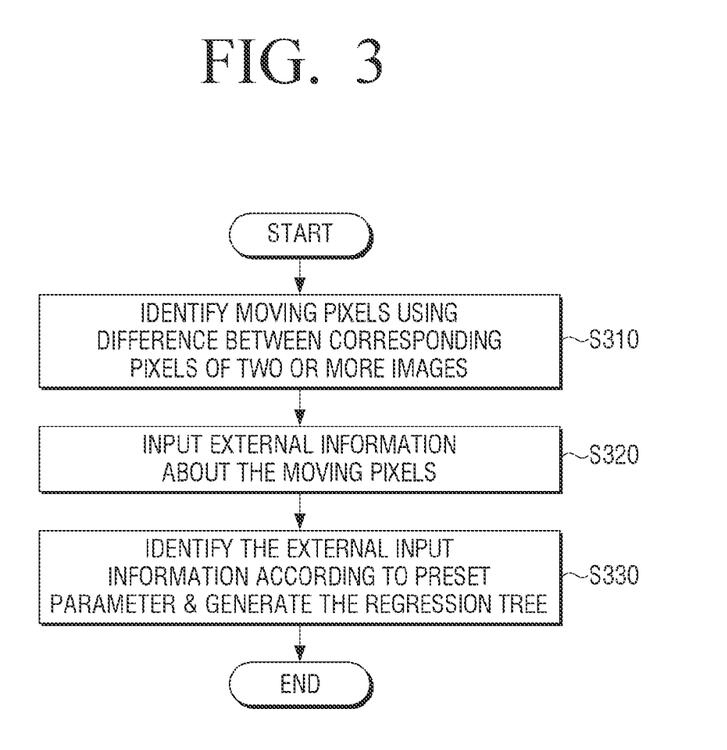
FIG. 3 illustrates a method for acquiring a motion history image to generate a regression tree according to an example embodiment.

FIG. 3 illustrates a method for obtaining a motion history image to generate a regression tree.

Figure 4:
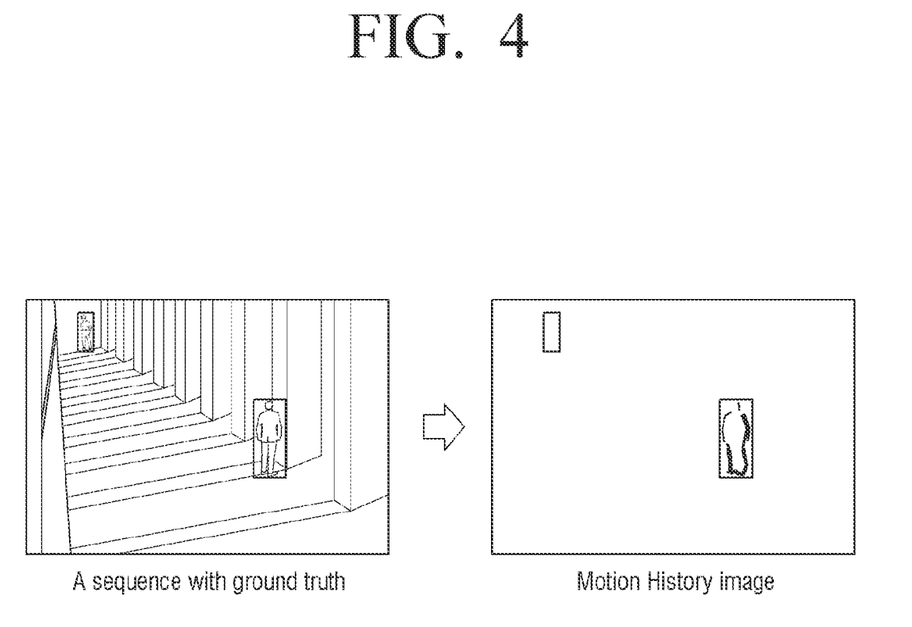
FIG. 4 illustrates a motion history image according to an example embodiment.

The motion history image is an image which is generated by identifying a moving object included in a plurality of successive image frames. In order to identify the moving object included in the image frames, at S310, a difference between corresponding pixels between two or more successive images is determined. The region that includes the difference may be considered as a region where the object is moved. The region is processed black, when the pixel value is varied according to movement of the object. The rest may be processed white. When all the works explained above are completed with respect to the moving objects included in the image, the motion history image as the one illustrated in the right-hand side of FIG. 4 is obtained. FIG. 4 illustrates the motion history image according to an embodiment.

At S320, in the regression tree construction stage, information about the moving object included in the motion history image is input from outside. That is, the information about the moving pixels is input, and this information about the moving pixels may be at least one of information about whether the moving pixels represent a person, location information of the moving pixels, and size information of the moving object. The location information of the moving pixels may be determined based on the coordinate data of the pixels, without requiring external input. For the size information of the moving pixels, the size (height) information is inputted from outside regarding the respective moving objects. At this time, a user may input the size information using an interface. As a result, the information about whether the object represents a person, the location information of the moving pixels, and the size information of the moving object including the moving pixels, are stored.

The regression tree is generated using the information about the moving pixels. That is, at S330, the regression tree is generated by dividing the external input information according to preset parameter(s).

At this time, the step of generating the regression tree by dividing the external input information based on the preset parameter(s) may include steps of generating the regression tree by arranging nodes having the external input information according to a first parameter, and reconstructing the regression tree according to a second parameter different from the first parameter, when the external input information of the leaf nodes of the generated regression tree are not similar to each other. That is, an optimum regression tree is constructed while parameters are varied.

In an embodiment, two neighboring pixels of the moving pixels may be randomly chosen. Distances to an object pixel are then calculated. When the distances between the two random pixels to the object pixel are below a preset value, the left link of the tree is traversed. On the contrary, when the distances between the two random pixels to the object pixel are equal to or greater than the preset value, the right link of the tree may be traversed. The verification of the regression tree as determined above is then performed. The leaf node of the regression tree may include information about a plurality of moving pixels, in which the pixels about the plurality of moving pixels have to be similar to each other. For example, it is useful to reconstruct the regression tree, when it is determined that a group of moving pixels (i.e., information of leaf node) exceptionally include pixels about a person and that such error is important. Reconstructing the regression tree is performed by adjusting the parameter values. The above-described process repeats until a regression tree that satisfies a preset error rate is determined.

FIG. 4 illustrates a successive image (video) photographed by a camera installed on a corner of a ceiling of a building. A motion history image is obtained with the method explained above, based on the successive images photographed by the camera. The size may then be input with respect to each of the moving objects. It is notable that an object that is farther away from the camera has a relatively smaller size and located at an upper side of the screen, while the object closer to the camera has a relatively larger size and located at a lower side of the screen.

Figure 5:
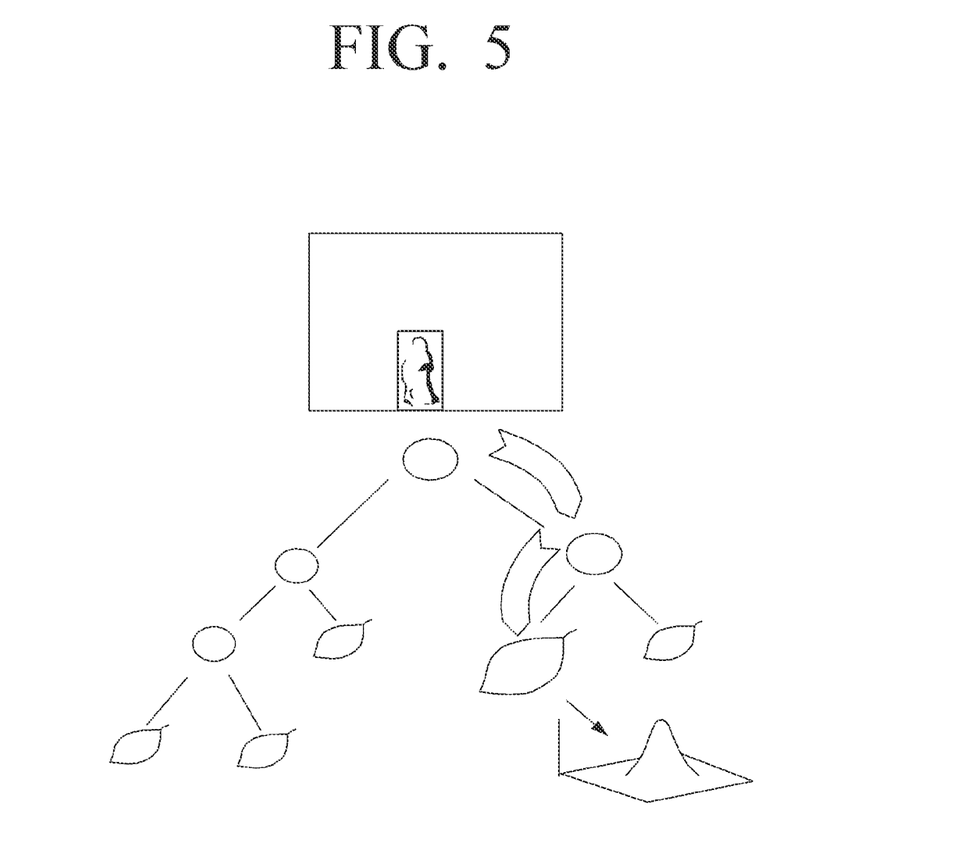
FIG. 5 illustrates a regression tree according to an example embodiment.

FIG. 5 illustrates a regression tree according to an embodiment.

As illustrated, the regression tree is generated with respect to the moving pixels, using inputted information. A specific leaf node includes dominant attribute information of the pixel group. As explained above, the leaf node includes at least one of information about whether the similar pixel group (i.e., pixels representing the same object) expresses a person, location information of the pixel group, and size information of the moving object expressed by the pixel group.

Figure 6:
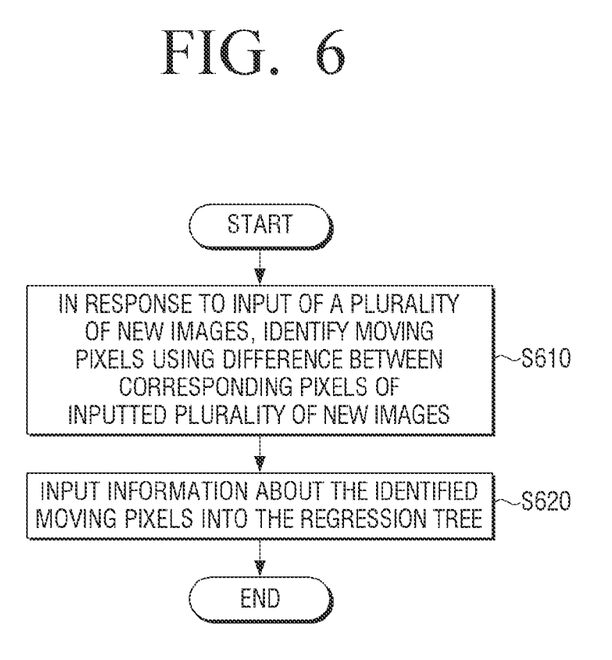
FIG. 6 is a flowchart illustrating a method of inputting moving object information of a newly inputted image for regression tree traversal.

FIG. 6 is a flowchart illustrating a method of inputting moving object information of a newly inputted image for regression tree traversal.

As illustrated in FIG. 6, the step of inputting the information about the moving object included in a newly inputted image into the regression tree may include, at S610, when a plurality of successive new images is inputted, identifying moving pixels using differences between pixels corresponding to the plurality of newly inputted images.

At S620, the information about the identified moving pixels is inputted to the regression tree.

The process is identical to the process of generating a motion history image which is described above. That is, the motion history image is generated with respect to newly input image. Specifically, a difference between corresponding pixels of two or more successive images is determined. A region including a difference may be considered to be a region where the object moves. The region with varied pixels values due to movement of the object is processed black. The rest may be processed white. The above-described operation is performed for all the moving objects included in the image.

Basically, a moving object has location information. Accordingly, the location information of the moving pixel may be input into the regression tree for the traversal of the regression tree. The leaf node, which is a result of the regression tree traversal, represents attributes of the moving pixels. The regression tree traversal allows fast identification of the attributes of the moving pixels, as the regression tree traversal may be done at log N (when it is assumed that there are N number of nodes).

Figure 7:
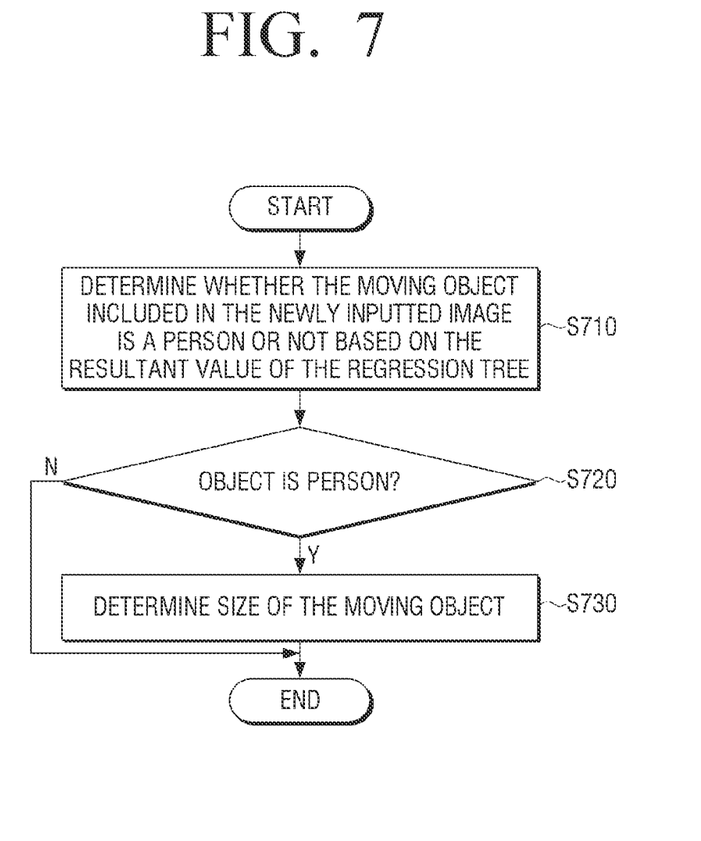
FIG. 7 is a flowchart illustrating a method for determining a size of a moving object.

FIG. 7 is a flowchart illustrating a method for determining a size of a moving object.

Referring to FIG. 7, after the regression tree traversal, at S710, it is determined as to whether the moving object included in the newly inputted image is a person or not. At S720-Y, when the object is determined to be a person, at S730, the size of the moving object is determined. The leaf node provides such information.

As described, when the size of the moving person is detected, the detection window scale is set accordingly.

As described, detection technology is provided according to an embodiment determines, which can rapidly determine a size of an object, using a regression tree having size information about the object pixels included in an image, and set the detection window that suits the size of the object. Specifically, an embodiment allows the system to rapidly set detection window for an image including a fixed background of a specific place and a moving object such as a person, at a camera apparatus such as a CCTV. It is possible to predict the size of an object moving in a specific place (e.g., person) based on the location of the object on the photographed image, while the photographed images are obtained by successively photographing the specific place. An embodiment involves generating a regression tree having information about correlation between the location on the photographed image and the size of the object, and rapidly determining the size of the object based on the location of the object on the image. When the size of the object is determined, the size of the detection window is then set accordingly.

Meanwhile, the method explained above may be stored in a form of a program on a non-transitory computer readable recording medium. The non-transitory computer recordable recording medium herein refers to a medium which is capable of semi-permanently storing data, rather than those that store data for a brief period of time such as a register or cache, and which can be read by an electronic appliance. For example, the non-transitory recordable readable recording medium may be CD, DVD, hard disk, blu-ray disk, USB, memory card and/or ROM. Further, the counting method explained above may be provided in a hardware IC chip in the form of embedded software. It will be appreciated by those skilled in the art that the described systems, methods and techniques may be implemented in digital electronic circuitry including, for example, electrical circuitry, logic circuitry, hardware, computer hardware, firmware, software, or any combinations of these elements. Apparatus embodying these techniques may include appropriate input and output devices, a computer processor, and a computer program product tangibly embodied in a non-transitory machine-readable storage device or medium for execution by a programmable processor. A process embodying these techniques may be performed by a programmable hardware processor executing a suitable program of instructions to perform desired functions by operating on input data and generating appropriate output. The techniques may be implemented in one or more computer programs that are executable on a programmable processing system including at least one programmable processor coupled to receive data and instructions from, and transmit data and instructions to, a data storage system, at least one input device, and at least one output device. Each computer program may be implemented in a high-level procedural or object-oriented programming language or in assembly or machine language, if desired; and in any case, the language may be compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of computer memory including, but not limited to, non-volatile memory, including by way of example, semiconductor memory devices, such as Erasable Programmable Read-Only Memory (EPROM), Electrically Erasable Programmable Read-Only Memory (EEPROM), and flash memory devices; magnetic disks, such as internal hard disks and removable disks; magneto-optical disks; Compact Disc Read-Only Memory (CD-ROM), digital versatile disk (DVD), Blu-ray disk, universal serial bus (USB) device, memory card, or the like. Any of the foregoing may be supplemented by, or incorporated in, specially designed hardware or circuitry including, for example, application-specific integrated circuits (ASICs) and digital electronic circuitry. Thus, methods for providing image contents described above may be implemented by a program including an executable algorithm that may be executed in a computer, and the program may be stored and provided in a non-transitory computer readable medium.

Figure 8A:
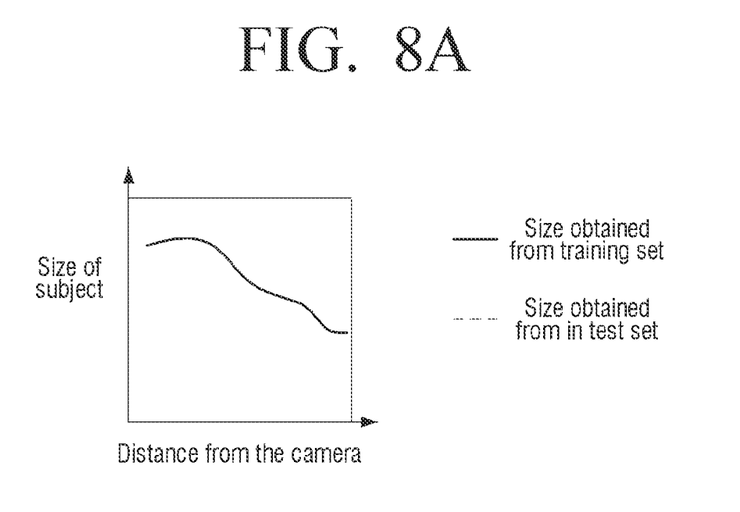
FIGS. 8(A)-8(B) are graphs illustrating a performance of the above-mentioned method for detecting the object.
Figure 8B:
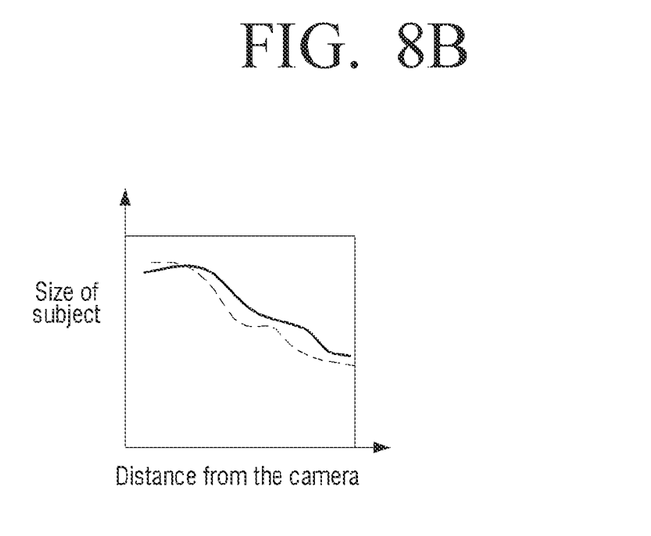

FIGS. 8(A)-(B) are graphs illustrating a performance of the above-mentioned method for detecting the object.

The graph FIG. 8(A) indicates that in the straining step, the information about the size of the object is input according to the location of the object with reference to the camera (i.e., location on the screen), and that optimum information is obtained by constructing a regression tree. The solid-line curve generally expresses that the size of the object decreases as it is farther away from the camera.

The graph FIG. 8(B) shows a size of the object belonging to the leaf node, as a result of generating motion history image of the moving object included in a plurality of successive image frames and inputting information about the moving pixels into the regression tree for the regression tree traversal. The leaf node represents a size of the object that includes a plurality of pixel groups, and it is possible to input all the moving pixel information constructing a single object and average the size values of the objects of the leaf nodes to determine a final size of the object. The dotted-line curve represents the finally determined object size, which is approximate to the solid-line curve.

Figure 9:
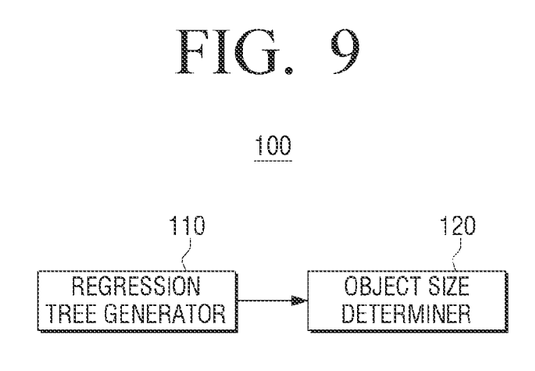
FIG. 9 is a block diagram of a detecting apparatus according to an embodiment.

FIG. 9 is a block diagram of a detecting apparatus 100 according to an embodiment. According to various embodiments, the detection apparatus may be implemented as at least one of CCTV camera, digital camera, smartphone, server, PC, tablet PC, digital television, and digital signage.

Referring to FIG. 9, an apparatus 100 for detecting an object according to an embodiment includes a regression tree generator 110 and an object size determiner 120.

The regression tree generator 110 is configured to input information of a moving object included in a plurality of images and generate a regression tree.

The object size determiner 120 is configured so that when a new image is inputted, the object size determiner 120 inputs the information about the moving object included in the newly inputted image into the regression tree and determine a size of a person included in the new image based on the resultant values of the regression tree.

At this time, the regression tree generator 110 may identify moving pixels using differences between corresponding pixels of two or more images, and when information about the moving pixels is inputted from outside, identify the external input information based on a preset parameter and generate the regression tree.

Further, the information about the moving pixels may be at least one of the information as to whether the moving pixels represent a person or not, the location information of the moving pixels, and the size information of the moving objects.

Further, the regression tree generator 110 may arrange nodes having the external input information according to the first parameter and generate the regression tree, and when the external input information of the leaf node of the generated regression tree are not similar to each other, may reconstruct the regression tree according to the second parameter which is different from the first parameter.

Further, the leaf node of the final regression tree may include size information of the moving object.

Further, the object size determiner 120 may determine the moving pixel using different corresponding pixels of a plurality of new images in response to input of a plurality of new images, and may input determined moving pixel information into the regression tree.

Further, the determined moving pixel information may include location information about the determined information.

Further, the object size determiner 120 may determine whether or not the moving object included in the newly inputted image is a person, based on the resultant values of the regression tree, and if determining the moving object to be the person, may determine the size of the moving object.

Further, the object detecting apparatus 100 may additionally include a photographer (not illustrated) configured to successively photograph a plurality of images including an object, and the object size determiner 120 may set a detection window scale according to the size of the person. The photographer may include various technical means to photograph an object. That is, the photographer may include a lens, an iris, an image processor, a storage, a shutter, or an image sensor.

Further, the object detecting apparatus 100 may include a configuration as that of a general electronic calculator. Accordingly, the object detecting apparatus 100 may include hardware configuration such as micro processing unit (MPU) or central processing unit (CPU), a cache memory, a data bus, a storage, or a wired/wireless interface, and software configuration of an operating system or an application to execute a specific purpose.

Further, the foregoing example embodiments and advantages are merely for purposes of example and are not to be construed as limiting the example embodiments. The present teaching can be readily applied to other types of apparatuses. Also, the description of the example embodiments is intended to be illustrative, and not to limit the scope of the claims.

What is claimed is:

1. A method for detecting an object, the method comprising:
    receiving input information relating to a moving object included in a plurality of images;
    identifying moving pixels, using a difference between corresponding pixels of two or more images;
    receiving information about the moving pixels;
    classifying the information about the moving pixels according to a preset parameter and generating a regression tree;
        in response to receiving a new image, communicating information of a moving object included in the new image into the regression tree; and
        determining a size of a person included in the new image based at least on a resultant value of the regression tree.

2. The method of claim 1, wherein the information about the moving pixels comprises at least one of information as to whether the moving pixels represent a person or not, location information of the moving pixels, and size information of the moving object.

3. The method of claim 1, wherein the classifying the information about the moving pixels according to the preset parameter and generating the regression tree comprises:
    arranging nodes having the information about the moving pixels according to a first parameter and generating the regression tree; and
    when the information of the generated regression tree is not reciprocally similar, reconstructing the regression tree based on a second parameter which is different from the first parameter.

4. The method of claim 3, wherein a leaf node of a final regression tree comprises size information of the moving object.

5. The method of claim 1, wherein the determining the size of the person included in the new image comprises:
    determining if the moving object included in the newly inputted image is a person, based on a resultant value of the regression tree; and
    determining a size of the moving object, when the moving object is the person.

6. The method of claim 1, further comprising setting a detection window scale according to the size of the person.

7. A method for detecting an object, the method comprising:
    receiving input information relating to a moving object included in a plurality of images and generating a regression tree;
    in response to receiving a new image, communicating information of a moving object included in the new image into the regression tree; and
    determining a size of a person included in the new image based at least on a resultant value of the regression tree,
        wherein the communicating the information of the moving object included in the new image comprises:
            identifying moving pixels in response to information regarding a plurality of new images, using a difference between corresponding pixels of the plurality of new images; and
            communicating information about the identified moving pixels into the regression tree.

8. The method of claim 7, wherein the information about the identified moving pixels comprises location information of the identified moving pixels.

9. An apparatus for detecting an object, comprising:
    a regression tree generator configured to input information of a moving object included in a plurality of images and generate a regression tree; and
    an object size determiner configured so that in response to input of a new image, the object size determiner is configured to input information of a moving object included in the newly inputted image into the regression tree, and determine a size of a person included in the new image based at least on a resultant value of the regression tree,
    wherein the regression tree generator is configured to identify moving pixels, using a difference between corresponding pixels of two or more images, in response to receiving external input information about the moving pixels, identify the external input information according to a preset parameter and generate the regression tree.

10. The apparatus of claim 9, wherein the information about the moving pixels comprises at least one of information as to whether the moving pixels represent a person or not, location information of the moving pixels, and size information of the moving object.

11. The apparatus of claim 9, wherein the regression tree generator is configured to arrange nodes having the external input information according to a first parameter and generate the regression tree, and when the external input information of the generated regression tree are not similar to each other, reconstruct the regression tree based on a second parameter which is different from the first parameter.

12. The apparatus of claim 11, wherein a leaf node of a final regression tree comprises size information of the moving object.

13. The apparatus of claim 9, wherein the object size determiner is configured to determine if the moving object included in the newly inputted image is a person, based on a resultant value of the regression tree, and determine a size of the moving object, when the moving object is the person.

14. The apparatus of claim 9, further comprising a photographing device configured to photograph the object, and wherein the object size determiner is configured to set a detection window scale according to a size of the person.

15. An apparatus for detecting an object, comprising:
    a regression tree generator configured to input information of a moving object included in a plurality of images and generate a regression tree; and
    an object size determiner configured so that in response to input of a new image, the object size determiner is configured to input information of a moving object included in the newly inputted image into the regression tree, and determine a size of a person included in the new image based at least on a resultant value of the regression tree;

wherein the object size determiner is configured to identify moving pixels in response to an input of a plurality of new images, using a difference between corresponding pixels of the plurality of newly inputted images, and input information about the identified moving pixels into the regression tree.

16. The apparatus of claim 15, wherein the information about the identified moving pixels comprises location information of the identified moving pixels.

17. An apparatus for detecting an object, comprising:
regression tree generator circuitry configured to input information of a moving object included in a plurality of images and generate a regression tree; and
object size determiner circuitry configured so that in response to input of a new image, the object size determiner circuitry is configured to input information of a moving object included in the newly inputted image into the regression tree, and determine a size of a person included in the new image based at least on a resultant value of the regression tree,
wherein the regression tree generator circuitry is configured to identify moving pixels, using a difference between corresponding pixels of two or more images, in response to receiving external input information about the moving pixels, identify the external input information according to a preset parameter and generate the regression tree.

* * * * *